US009408254B2

(12) United States Patent
Jain

(10) Patent No.: US 9,408,254 B2
(45) Date of Patent: Aug. 2, 2016

(54) ACCESS POINT FOR WIRELESS LOCAL AREA NETWORK

(75) Inventor: Raj Kumar Jain, Singapore (SG)

(73) Assignee: Lantiq Beteiligungs-GmbH & Co.KG, Neubiberg (DE)

( * ) Notice: Subject to any disclaimer, the term of this patent is extended or adjusted under 35 U.S.C. 154(b) by 0 days.

(21) Appl. No.: 13/228,949

(22) Filed: Sep. 9, 2011

(65) Prior Publication Data

US 2011/0317679 A1  Dec. 29, 2011

Related U.S. Application Data

(63) Continuation of application No. 11/947,960, filed on Nov. 30, 2007.

(51) Int. Cl.
  *H04W 88/10* (2009.01)
  *H04W 84/12* (2009.01)
  *H04W 74/08* (2009.01)

(52) U.S. Cl.
  CPC ............ *H04W 88/10* (2013.01); *H04W 74/08* (2013.01); *H04W 84/12* (2013.01)

(58) Field of Classification Search
  USPC ......... 370/274, 277, 279, 293, 315, 328, 338, 370/339, 535, 536, 542; 455/13.3, 15–16, 455/103, 132
  See application file for complete search history.

(56) References Cited

U.S. PATENT DOCUMENTS

| | | | |
|---|---|---|---|
| 7,499,504 B2 | 3/2009 | Soffer | |
| 7,590,429 B2 * | 9/2009 | Hansen et al. | 455/562.1 |
| 8,064,835 B2 * | 11/2011 | Rezvani et al. | 455/62 |
| 2004/0082356 A1 | 4/2004 | Walton et al. | |
| 2004/0125787 A1 * | 7/2004 | May et al. | 370/350 |
| 2005/0058212 A1 | 3/2005 | Shao | |
| 2005/0128993 A1 | 6/2005 | Yu et al. | |
| 2005/0135291 A1 * | 6/2005 | Ketchum et al. | 370/319 |
| 2005/0141407 A1 | 6/2005 | Sandhu | |
| 2005/0185671 A1 | 8/2005 | Hansen et al. | |
| 2005/0232208 A1 * | 10/2005 | Hansen | 370/338 |
| 2005/0243755 A1 * | 11/2005 | Stephens | 370/328 |
| 2005/0276245 A1 | 12/2005 | Hidaka | |
| 2006/0034165 A1 * | 2/2006 | Levy | 370/208 |
| 2006/0035653 A1 * | 2/2006 | Karaoguz | H04B 7/043 455/500 |
| 2006/0183421 A1 * | 8/2006 | Proctor et al. | 455/11.1 |
| 2006/0193271 A1 * | 8/2006 | Proctor et al. | 370/294 |
| 2007/0025392 A1 * | 2/2007 | Moorti et al. | 370/465 |

FOREIGN PATENT DOCUMENTS

WO  WO-2006086878  8/2006

* cited by examiner

*Primary Examiner* — Redentor Pasia

(57) ABSTRACT

An access point and a method for transmitting data through an access point are disclosed, In one embodiment the access point includes a MAC processor configured to process and output a single transmit data stream, and a physical layer (PHY) processor configured to split the single transmit data stream in a plurality of transmit data streams, the physical layer (PHY) processor further configured to process a first group of one or more channel paths for the first set of one or more transmit data streams according to the first mode of operation and a second group of one or more channel paths for the second set of one or more transmit data streams according to the second mode of operation.

20 Claims, 5 Drawing Sheets

FIG. 4

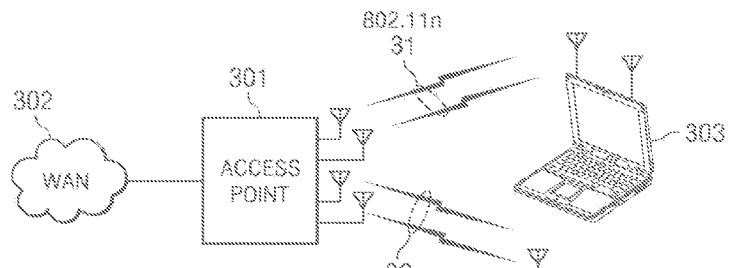
FIG. 3
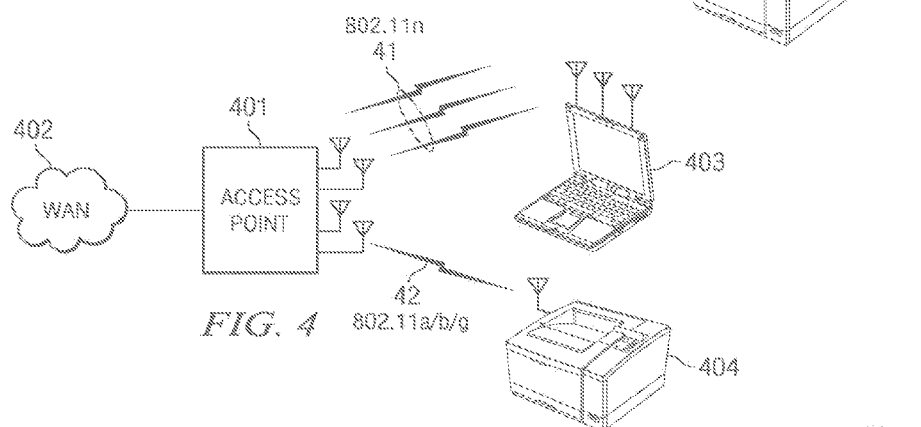
FIG. 4
| ACCESS POINT APPLICATION | PHY 1 | PHY 2 | |
|---|---|---|---|
| 802.11n | 4 x 4 @ 2.4 GHz | --- | 701 |
| 802.11n | 4 x 4 @ 5.2 GHz | --- | 702 |
| 802.11n + 802.11a | 3 x 3 @ 2.4 GHz | 1 x 1 @ 5.2 GHz | 703 |
| 802.11n + 802.11b/g | 3 x 3 @ 5.2 GHz | 1 x 1 @ 2.4 GHz | 704 |
| 802.11n + REPEATER | 2 x 2 @ 2.4 GHz | 2 x 2 @ 5.2 GHz | 705 |
| 802.11n + HOME NETWORKING | 3 x 3 @ 2.4 GHz (WLAN) | 1 x 1 @ 1 GHz (COAX) | 706 |
| | 3 x 3 @ 5.2 GHz (WLAN) | 1 x 1 @ 1 GHz (COAX) | 707 |
FIG. 7

ACCESS POINT FOR WIRELESS LOCAL AREA NETWORK

This is a continuation application of U.S. application Ser. No. 11/947,960, entitled "Access Point for Wireless Local Area Network," which was filed on Nov. 30, 2007, and which is incorporated herein by reference.

TECHNICAL FIELD

Background

Home, business and commercial networks are becoming increasingly diverse and more often involve the interaction of both wireless local area networks (WLAN) and wired networks. A typical infrastructure for a home or business network includes one or more wireless or wired gateways, such as a modem or set-top box, to service one or more client applications or stations. As the client stations and applications in home and business networks become more diverse, the traditional gateway devices are unable to provide interfaces for all of the applications.

The gateway may, for example, be required to provide interfaces to mobile devices, such as laptops and personal digital assistants, and to provide interfaces to stationary devices, such as personal computers and consumer electronics. Each of the various devices and client applications may use different communication standards, protocols, frequencies or technology, such as, for example, wireless networks complying with the 802.11 standards and wired networks using twisted pair, cable or power line communication media. Accordingly, the known gateway devices may not support all of the client applications that a user desires to add to a home or business network.

SUMMARY OF THE INVENTION

Embodiments of the present invention include, for example, physical layer (PHY) and media access control (MAC) layer circuitry in an access point comprising a first group of one or more channel paths for processing a first set of one or more transmit data streams according to a first mode of operation, and a second group of one or more channel paths for processing a second set of one or more transmit data streams according to a second mode of operation.

BRIEF DESCRIPTION OF THE DRAWINGS

For a more complete understanding of the present invention, and the advantages thereof, reference is now made to the following descriptions taken in conjunction with the accompanying drawings, in which:

FIG. 3 illustrates a WLAN according to one embodiment of the invention;

FIG. 4 illustrates a WLAN according to another embodiment of the invention;

FIG. 7 is a table illustrating PHY functionality according to embodiments of the invention.

DETAILED DESCRIPTION

Figure 1:
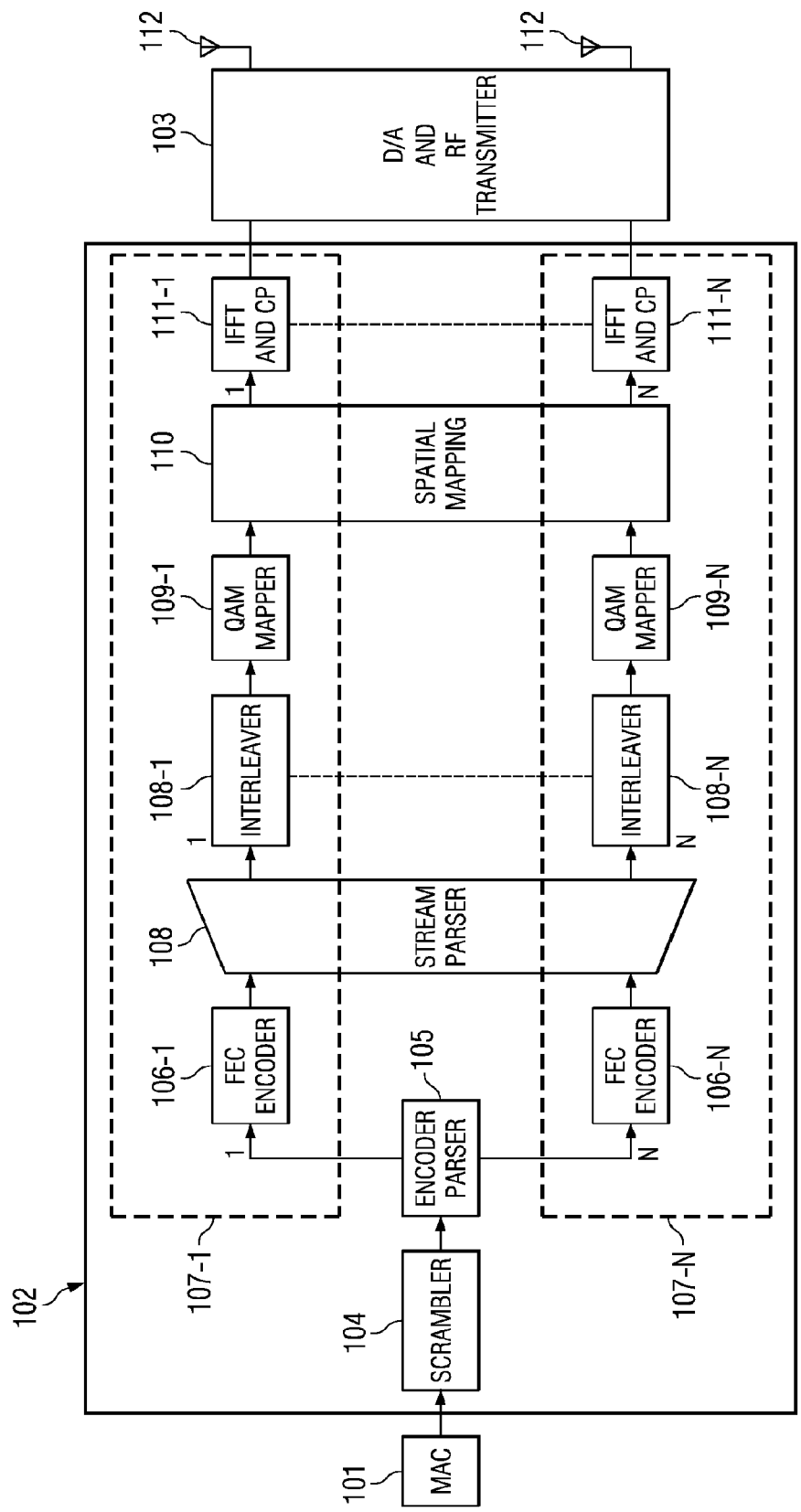
FIG. 1 illustrates one embodiment of a PHY transmitter in a WLAN access point.

The present invention provides many applicable inventive concepts that can be embodied in a wide variety of specific contexts. The specific embodiments discussed are merely illustrative of specific ways to make and use the invention, and do not limit the scope of the invention. The following detailed description explains exemplary embodiments of the present invention. The description is not to be taken in a limiting sense, but is made only for the purpose of illustrating the general principles of embodiments of the invention. In the various figures, identical or similar entities, modules, devices etc. may have assigned the same reference number.

In the following, various embodiments will be described wherein an access point may independently and concurrently service two or more client applications via two or more channels, frequencies, bands and/or networks. As will be described later in more detail, the independent and concurrent operation of physical layer channels allows for flexible and dynamic configuration of the access point which may, for example, be used to optimize the data traffic to and from the various client applications by the access point.

An access point configured to operate under the IEEE 802.11 standards typically comprises a media access control (MAC) layer, a physical layer (PHY), an analog front-end, and an RF transmitter. The MAC layer provides functionality to allow reliable data delivery over the PHY media. Data may be delivered based on an asynchronous, connectionless transmission of MAC layer data. The MAC provides the fundamental access method of 802.11 called Carrier-Sense Multiple Access with Collision Avoidance (CSMA/CA). The CSMA/CA protocol avoids collisions among stations by utilizing a random backoff time if the transmission medium is busy. The MAC also provides security and privacy services to protect the data.

The PHY is a transmitter modulator and demodulator between the MAC and the analog front-end and RF transmitter. The analog front-end and RF transmitter couple the access point to the transmission media. The PHY provides the interface to the upper MAC layer for transmission and reception of data. The PHY is the physical layer at the bottom of the protocol stack. The MAC layer is right above the PHY in the protocol stack. Current IEEE 802.11 standards provide both Frequency Hopping Spread Spectrum (FHSS) and Direct Sequence Spread Spectrum (DSSS) PHY definitions. The 802.11a extension defines multiplexing techniques that can achieve data rates up to 54 Mbps in the 5.2 GHz frequency band. The 802.11b extension defines 11 Mbps and 5.5 Mbps data rates utilizing High Rate DSSS (HR/DSSS). The 802.11b extension also defines a rate shifting technique where 11 Mbps networks may fall back to 5.5 Mbps, 2 Mbps, or 1 Mps under certain noise conditions or to inter-operate with legacy 802.11 PHY layers. The 802.11b standard is defined to operate in the 2.4 GHz frequency band. The 802.11g extension defines a PHY that is basically the same as 802.11a, but that operates in the 2.4 GHz frequency band. The 802.11g standard is independent of 802.11a, which operates in a different frequency band, and will fall back to 802.11b operation if required by the user or radio conditions.

The PHY is the circuitry or functional block that takes care of encoding and decoding between the pure digital domain of the MAC layer and the analog domain in the analog front-end. The analog front end provides digital-to-analog (D/A) and analog-to-digital (A/D) conversion and radio frequency (RF) transmission for signals that are provided to the transmission medium. One embodiment of an analog front-end is described in co-pending U.S. patent application Ser. No.

11/928,545, entitled "System and Method for Providing a Versatile RF and Analog Front-End for Wireless and Wired Networks," filed Oct. 30, 2007, the disclosure of which is hereby incorporated by reference herein in its entirety.

IEEE standard 802.11n is currently under development and will allow the access point to organize data into spatial streams that are transmitted simultaneously. Legacy 802.11 standards (i.e. 802.11a/b/c/d/e/f/g/h) use single-input/single-output (SISO) streams between the access point and client device. 802.11n introduces multi-input/multi-output (MIMO) which allows for multiple simultaneous streams between the transmit and receive antennas. A propagation path ("MIMO path") exists between each transmit and receive antenna. If there are "N" transmit antennas, and "M" receive antennas in the system, then there are a total of N×M MIMO paths between the access point and the client device. MIMO systems are typically characterized as "4×4", "2×2", "2×3", etc., which represents the numbers of transmit and receive antennas, respectively. It is expected that future versions of the 802.11 standard, after version 802.11n, will further define the operation of MIMO devices. Additionally, home networking standards are being developed to support networks in a home or small office.

FIG. 1 illustrates one embodiment of transmission circuitry for an access point PHY, such as an access point complying with the 802.11n standard. PHY transmitter 102 and the corresponding receiver (FIG. 2) operate similarly in both the green field (pure 802.11n MIMO mode without legacy support) mode and the mixed mode (MIMO and legacy).

Incoming data bits from MAC 101 are randomized using scrambler 104 in order to avoid the occurrence of long strings of zero and one bits. The scrambled bits from scrambler 104 are passed to encoder parser 105 where the signal is demultiplexed across forward error correction (FEC) encoders 106 in encoding streams 107. The number "N" of encoding streams depends upon the selected MIMO mode of operation. For example, in one embodiment, one encoding stream is used for 1×1 and 2×2 systems, and two encoding streams are used for 3×3 and 4×4 systems. FEC encoders 106 encode the data to enable channel error correction capabilities. Stream parser 108 divides the output of FEC encoders 106 into blocks of bits. In interleaver 108, the blocks of bits are interleaved. The interleaved bits are mapped to constellation points in QAM mapper 109. The encoding streams pass through spatial mapper 110, which distributes the complex symbols to transmit chains 111. In each chain, an inverse fast Fourier transform (IFFT) is taken to create an orthogonal frequency-division multiplexing (OFDM) waveform and a cyclic prefix (CP) is appended in front of the IFFT output in block 111. The cyclic prefix is used to eliminate inter-symbol interference (ISI) between the OFDM symbols. The cyclic prefix also helps to maintain orthogonality between the carriers at the receiver in a multipath channel. The digital signals are then converted to analog and up-converted to radio frequency (RF) in front-end 103. The RF signals are transmitted through TX antennas 112 to client devices.

Figure 2:
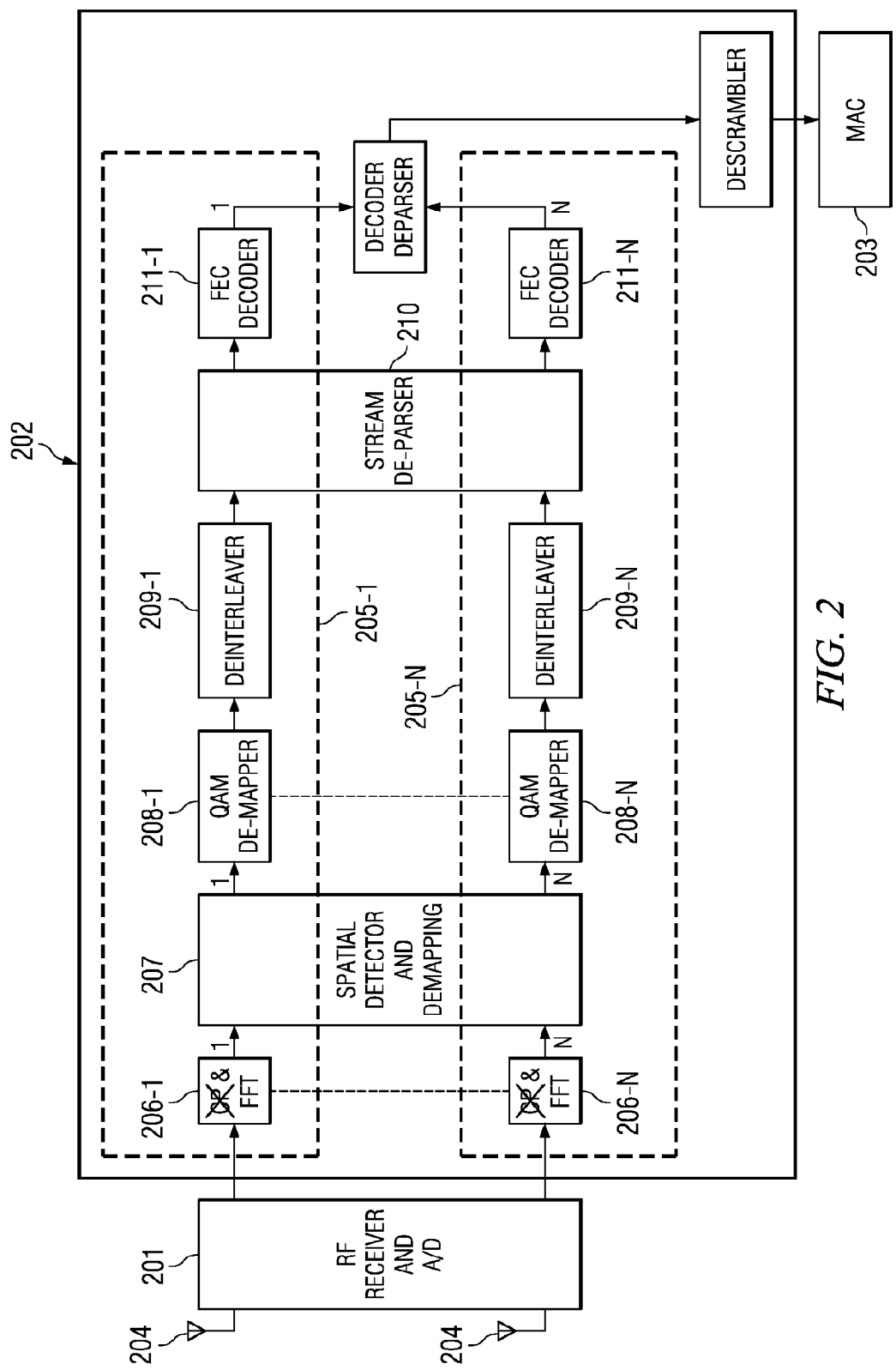
FIG. 2 illustrates one embodiment of a PHY receiver in a WLAN access point.

FIG. 2 illustrates one embodiment of receive circuitry for an access point PHY 202, such as an access point complying with the 802.11n standard. Receive antennas 204 receive RF signals from client devices. The received RF signals are down-converted to baseband and converted to digital samples in front-end 201. Front-end 201 provides the digital samples for subcarriers to decoding streams 205. The cyclic prefix is removed and a fast Fourier transform (FFT) is performed in block 206. The complex estimates corresponding to a particular subcarrier from all the received chains are grouped together to form a vector. Spatial detector 207 spatially separates the digital samples into N signals that are provided to QAM demodulators 208, which demodulate the complex symbols. The signals are then deinterleaved in deinterleaver 209. Spatial demapper 210 collects the deinterleaved signals from the N decoding paths and multiplexes them to FEC decoders 211. After decoding, the signals are deparsed 212 and descrambled 213 to rearrange the bits for input to MAC 203.

The 802.11n standard allows access points and clients to provide high datarates using up to four spatial streams for transmitting data simultaneously. Two or more antennas can be used to provide MIMO capabilities for transmit and receive diversity and to achieve higher datarates. MIMO systems with spatial diversity achieve better performance, such as longer range for a given data rate, and higher data rates compared to SISO systems in a given location.

Embodiments of the invention expand the use of the 802.11n PHY into different communication system applications. The four spatial streams used in 802.11n may be used in different independent channels thereby extending the different streams into multiple different applications. The MIMO multi-streams of 802.11n may be extended or reconfigured into multiple independent SISO/MIMO channels. According to embodiments of the invention, access points use the same baseband transmitter/receiver PHY to process the independent channels, which may be transmitted over different frequencies in WLAN and/or wired networks. The access point may support both 802.11n and legacy 802.11 standards. For example, one or more of the access point antennas may be used to communicate with one or more single channel SISO legacy systems, while the other antennas are used for 802.11n MIMO communication (e.g. 3×3, 3×2, 2×2, 2×1, etc.).

In embodiments of the invention, multi-path PHY baseband encoding streams 107 and decoding streams 205 are split into independent channels over the MAC layer to the RF front-end. This allows the access point PHY to support multiple configurations, such as a 4×4 MIMO system, two 2×2 MIMO systems, a combination of MIMO (3×3, 2×2, etc) systems and one or more SISO systems, or up to four independent SISO systems. It will be understood that various combinations of MIMO and SIMO paths may be realized in the PHY using embodiments of the present invention. Instead of a single data stream from the MAC to the PHY baseband circuitry, multiple independent paths, such as four independent paths, may be established from the MAC layer to the PHY baseband. In one embodiment, the architecture of special mapper 110 is flexible so that different spatial streams may be mapped into different transmit chains depending upon the system configuration.

FIG. 3 illustrates one embodiment of the invention in which access point 301 is coupled to wide area network (WAN) 302. Access point 301 may be, for example, a DSL modem, cable modem or set-top box. WAN 302 may be the Internet, an intranet, an Ethernet network, or any other pubic or private data network. Client device 303, such as laptop computer, is in communication with access point 301 via 2×2 MIMO channels 31. Simultaneously, client device 304, such as a network interface card (NIC) in a printer, is in communication with access point 301 via 2×2 MIMO channels 32. Channels 31 and 32 may comply with the IEEE 802.11n standard. The PHY in access point 301 independently processes the data for clients 303 and 304 using separate encoding and decoding streams. Channels 31 and 32 may operate at the same or different frequencies and bandwidths defined in the 802.11n standard, such as both may operate at 2.4 GHz, or one may operate at 2.4 GHz while the other operates at 5.2 GHz.

FIG. 4 illustrates another embodiment of the invention in which access point 401 is coupled to wide area network (WAN) 402. Access point 401 may be, for example, a DSL modem, cable modem or set-top box, and WAN 502 may be the Internet, an Ethernet network or any other public or private data network. Client device 403, such as laptop computer, is in communication with access point 401 via 3×3 MIMO channels 41. Simultaneously, client device 404, such as a network interface card (NIC) in a printer, is in communication with access point 401 via 1×1 SISO channel 42. Channels 41 may comply with the IEEE 802.11n standard, while channel 42 complies with a legacy standard, such as 802.11 a/b/g. The PHY in access point 401 independently processes the data for clients 403 and 404 using separate encoding and decoding streams. Three streams are assigned to process 802.11n data and one stream operates as the PHY defined in the appropriate legacy 802.11 standard. Channels 41 may operate at any of the frequencies and bandwidths defined in the 802.11n standard, such as 2.4 GHz or 5.2 GHz. Channel 42 operates at 2.4 GHz or 5.2 GHz as appropriate for the selected legacy standard.

Figure 5:
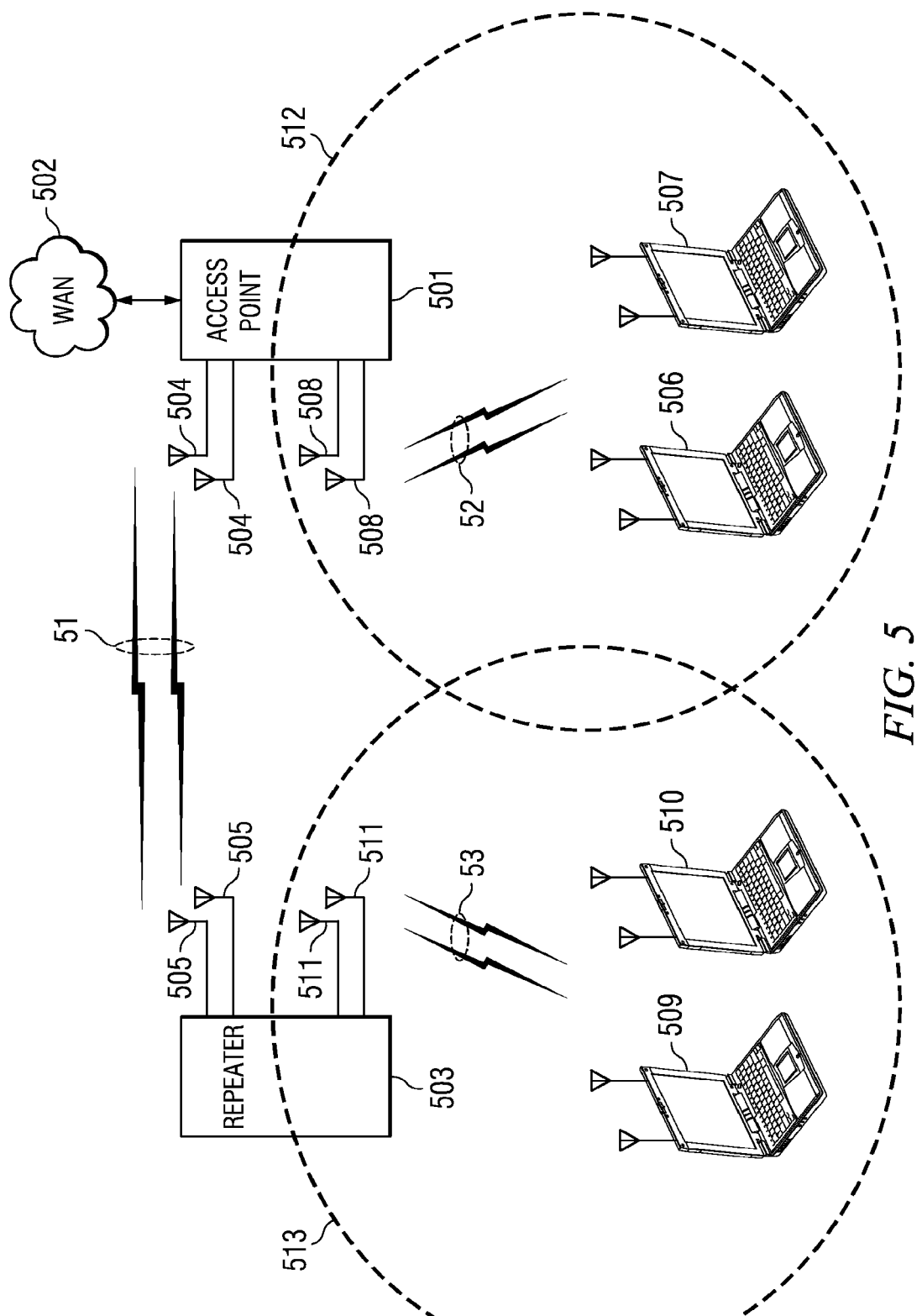
FIG. 5 illustrates a WLAN according to a further embodiment of the invention.

FIG. 5 illustrates another embodiment of the invention. Access point 501 is in communication with WAN 502 and provides an interface to WLAN components in service area 512, such as mobile clients 506 and 507, using, for example, 802.11 standards. Access point 501 may establish valid communication links to devices operating within service area 512. Outside of service area 512, access point 501 may be unable to establish communication links due to signal attenuation and/or noise. However, repeater access point 503 may be used to extend WLAN coverage to service area 513. Access points 501 and 503 may be capable of communicating using 802.11n MIMO channels. Access point 501 may designate antennas 504 and associated PHY baseband streams to communicate with repeater access point 503 over channels 51. Simultaneously, access point 501 may designate antennas 508 and associated PHY baseband streams to communicate over channels 52 with wireless clients 506 and 507.

Repeater access point 503 may be configured using the same type of MAC, PHY and front-end circuitry used in access point 501, such as the circuitry illustrated in FIGS. 1 and 2; however, instead of receiving signals from WAN 502, the input to repeater 503 is received via channels 51. By placing repeater access point 503 at a distance from access point 501, the effective service area for access point 501 may be expanded. For example, if access point 501 may be a home network gateway, such as DSL modem or cable set-top box, located on a first floor of a home. If wireless clients 509 and 510 are located in different part of the home, such as on the second floor, they may not be within wireless range of access point 501. Repeater access point 503 may be located such that it is able to communicate with access point 501 and to establish channels 53 with clients 509 and 510. This expands the WLAN served by access point 501 to include clients 509 and 510.

It will be understood that channels 51, 52 and 53 may operate at any frequency or according to any standard. In one embodiment, channels 51 are 2×2 MIMO channels operating at 5.2 GHz according to 802.11n, while channels 52 and 53 are 2×2 MIMO channels operating at 2.4 GHz according to 802.11n. In other embodiments, the data streams in access point 501 and repeater 502 may be configured so that channels 51, 52, and/or 53 are 3×3, 3×2, 2×1, or 1×1 MIMO channels or 1×1 SIMO channels, for example. Additionally, channels 51, 52 and 53 may operate according to 802.11n or any legacy standard, such as 802.11a/b/g. Channels 51, 52, 53 may also operate at any frequency, such as 2.4 GHz or 5.2 GHz, or bandwidth, such as 20 MHz or 40 MHz, that is appropriate for the designated standard.

Figure 6:
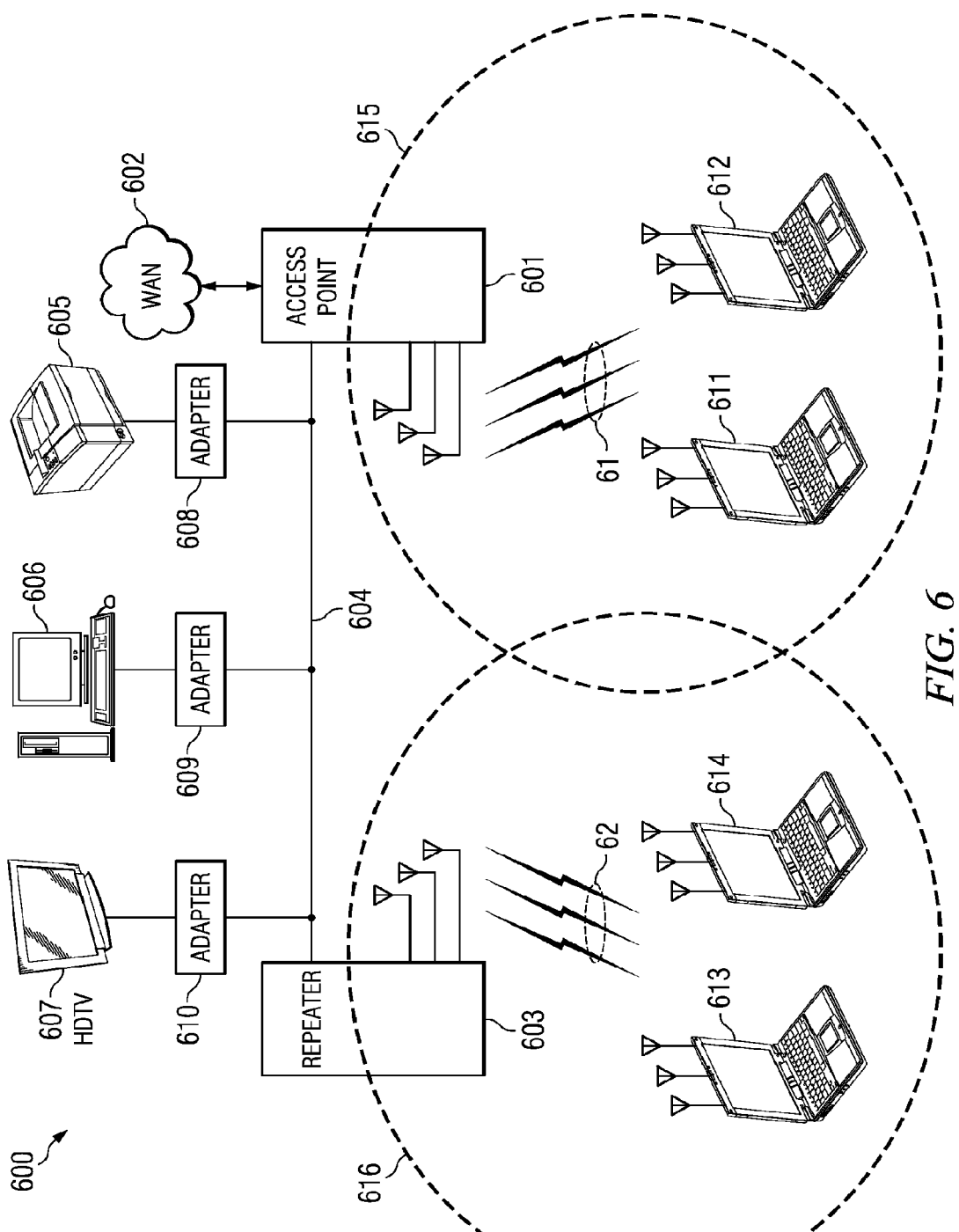
FIG. 6 illustrates a home network WLAN according to one embodiment of the invention.

FIG. 6 illustrates another embodiment in which access point 601 is a gateway, modem or router for home network 600. Access point 601 provides the interface to WAN 602 for the home network. Access point 601 is in direct wireless communication with clients 611 and 612 via channels 61, which may be, for example, 3×3 MIMO channels according to the 802.11n standard. In the illustrated embodiment, the analog front-end for access point 601 is configured to interface with three wireless antennas. Three corresponding data streams would also be configured for the baseband PHY in access point 601. The front-end and a channel in the baseband PHY of access point 601 is also configured to interface with wired network 604, which may be a coaxial cable network, a power line network, a CAT5e cable network, or a twisted pair network, for example.

Repeater access point 603 is also coupled to wired network 604 and receives data from access point 601 via wired network 604. Repeater access point 603 may be in direct wireless communication with clients 613 and 614 via channels 62, which may be, for example, 3×3 MIMO channels according to the 802.11n standard. Repeater access point 603 may be configured using the same type of MAC, PHY and front-end circuitry used in access point 601, such as the circuitry illustrated in FIGS. 1 and 2. Repeater access point 603 expands the coverage area for the WLAN from service area 615, which is provided by access point 601, to also include service area 616. Repeater access point 603 is in direct wireless communication with clients 613 and 614 via channels 62, which may be, for example, 3×3 MIMO channels according to the 802.11n standard. Because repeater access point 603 is linked to access point 601 via wired network 604, repeater 603 may be located at a greater distance from access point 601 than would be supported by wireless channels, such as channels 51 (FIG. 5), for example.

In other embodiments, channels 61 and 62 may operate at any frequency or according to any standard. In one embodiment, channels 61 and 62 are 3×3 MIMO channels operating at 2.4 GHz or 5.2 GHz according to 802.11n. In other embodiments, the data streams in access point 601 and repeater access point 602 may be configured so that channels 61 and/or 62 operate as 3×3, 3×2, 2×1, 1×1 or any other N×M MIMO channels or 1×1 SIMO channels, for example. Additionally, channels 61 and 62 may operate according to 802.11n or any legacy standard, such as 802.11a/b/g. Channels 61 and 62 may also operate at any frequency, such as 2.4 GHz or 5.2 GHz, or bandwidth, such as 20 MHz or 40 MHz, that is appropriate for the designated standard.

Additional clients may be connected to home network 600 via wired network 604. Devices such as printer 605, personal computer (PC) 606, and high-definition television (HDTV) 607 may be coupled to wired network 604 via an appropriate adapter 608-610. The PHY circuitry in access point 601 may be virtually divided into separate PHYs supporting different applications and data streams. Devices 605-607 communicate using the same baseband PHY layer in access point 601. The other PHYs in access point 601 are used, for example, to support wireless communication. Alternatively, in other embodiments, the other PHYs may also support additional wireless networks.

It will be understood that the access points described herein, such as those described with respect to the networks of FIGS. 3-6, may be configured in different ways using a PHY that is configurable or reconfigurable. In one embodiment, the access points may operated using a fixed configuration that is set during installation, network set-up, or at some other time.

The access point and network configuration may be established using, for example, a software application running on a client, such as a laptop or personal computer. The software application may allow a user to dynamically set the channels and/or MIMO modes used in the network. In other embodiments, the access points may be configured to operate as ad hoc networks in which an access point detects the network clients and determines their capabilities. The access point may then configure its operating parameters based upon the network clients. In networks having multiple access points, such as in FIGS. 5 and 6, the repeater access point may be configured by another access point that operates as a master access point for the network, by a client communicating with the repeater access point, or by itself, such as in an ad hoc network.

FIG. 7 shows table 700, which illustrates examples of the access point PHY configuration for different applications. Rows 701 and 702 represent an access point that is used in a 4×4 MIMO configuration. The PHY in the access point is configured to operate so that all four of the encoding/decoding data streams support 4×4 MIMO according to 802.11 either in the 2.4 GHz or 5.2 GHz band. Row 703 represents an embodiment in which an access point is configured to support both 3×3 MIMO channels and a 1×1 SIMO channel, such as access point 401 (FIG. 4), for example. The access point PHY may be divided into two virtual PHYs (PHY1 and PHY2), wherein PHY1 supports three 802.11n data streams for the 3×3 MIMO configuration, and PHY2 supports one 802.11a data stream for a 1×1 SIMO channel at 5.2 GHz. Row 704 is similar to row 703; however, the access point is supporting an 802.11b/g 1×1 SIMO channel in addition to the 3×3 MIMO channel. PHY2 would be configured to support the data stream for the 802.11b/g SIMO channel at 2.4 GHz. In rows 703 and 704, PHY1 is shown as supporting 3×3 MIMO channels at 2.4 GHz and 5.2 GHz, respectively. It will be understood that PHY1 may support MIMO channels that operate at either 2.4 GHz or 5.2 GHz in other configurations.

Row 705 illustrates a configuration in which the access point is supporting both a repeater and client devices using 2×2 MIMO channels according to 802.11n, such as access point 501 (FIG. 5). The access point PHY may be divided into two virtual PHYs (PHY1 and PHY2) to support this operation. For example, PHY 1 may support the two data channels communicating with the client devices, and PHY2 may support the two data channels communicating with the repeater device.

Rows 706 and 707 illustrate a configuration in which the access point supports both a wired network and a WLAN. The WLAN allows the access point to communicate with client devices using 3×3 MIMO channels according to 802.11n, such as access point 601 (FIG. 6). The access point also provides an interface to the wired network, such as a network using a coaxial cable to transmit data. The access point PHY may be divided into two virtual PHYs (PHY1 and PHY2) to support this operation. For example, PHY 1 may support the three data channels communicating with the client devices according to the 802.11n standard. PHY2 may support the one data channels communicating with the wired network. As illustrated in Table 700 at rows 706 and 707, the 3×3 MIMO channels supported by PHY1 may operate at either 2.4 GHz or 5.2 GHz. In other embodiments, PHY2 may support data to be transmitted via a coaxial cable, a twisted pair, a power line, or other wired networks. PHY1 and PHY2 may also be configured to support home networking standards.

Embodiments of the present invention allow an access point to support multiple channel configurations, such as a mix of MIMO, SIMO and wired channels configured according to the 802.11 standards. Depending upon the selected mode of operation, the access point PHY may be configured to function as two or more virtual PHYs wherein each virtual PHY supports data streams for different standards. The selection of the PHY operating modes may be made dynamically by the user or access point during operation in one embodiment, such as selecting channel modes based upon channel quality and client or application demand. In other embodiments, the PHY operating modes may be fixed.

In the above description, embodiments have been shown and described herein enabling those skilled in the art in sufficient detail to practice the teachings disclosed herein. Other embodiments may be utilized and derived there from, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

It is further to be noted that specific terms used in the description and claims may be interpreted in a very broad sense. For example the term "data" may be interpreted to include every form of representing the data, such as an encrypted form of the data, an analog or digital representation, a modulated signal representing the data etc. Furthermore, the terms "circuit" or "circuitry" used herein are to be interpreted in a sense not only including hardware but also software, firmware or any combinations thereof. Furthermore the terms "coupled" or "connected" may be interpreted in a broad sense not only covering direct but also indirect coupling.

The accompanying drawings that form a part hereof show by way of illustration, and not of limitation, specific embodiments in which the subject matter may be practiced. Although the figures and detailed description illustrate examples in which the access point supports two channel sets, such as to clients and repeaters, it will be understood that in other embodiments the access point may support three or more channel sets. Moreover, the PHY may be configured to process three or more independent data streams in other configurations.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An access point comprising:
a MAC processor configured to process and output a single transmit data stream; and
a physical layer (PHY) processor configured to split the single transmit data stream into a first set of one or more transmit data streams and a second set of one or more transmit data streams, the PHY processor further configured to concurrently process the first set of one or more transmit data streams according to a first MIMO mode of the PHY processor in a first group of one or more channel paths of the PHY processor and the second set of one or more transmit data streams according to a second MIMO mode of the PHY processor in a second group of one or more channel paths of the PHY processor;
the PHY processor configured to dynamically change channel allocation by reallocating the channel paths of the first group and the second group to a third group of one or more of the channel paths of the PHY processor and a fourth group of one or more of the channel paths of the PHY processor such that the PHY processor is configured to split the single transmit data stream into a third set of one or more transmit data streams and a fourth set of one or more transmit data streams and the PHY processor is configured to concurrently process the third set of one or more transmit data streams according to a third MIMO mode of the PHY processor in the third group of one or more of the channel paths of the PHY processor and the fourth set of one or more transmit data streams according to a SISO mode of the PHY processor in the fourth group of one or more of the channel paths of the PHY processor.

2. The access point of claim 1, wherein the PHY processor comprises a first virtual PHY for the first group of channel paths and a second virtual PHY for the second group of channel paths.

3. The access point of claim 1, wherein the first MIMO mode, the second MIMO mode, and the third MIMO mode of the PHY processor comply with an IEEE 802.11n standard.

4. The access point of claim 1, wherein the first MIMO mode, the second MIMO mode, and the third MIMO mode of the PHY processor comply with an IEEE 802.11n standard, and wherein the SISO mode of the PHY processor complies with a legacy IEEE 802.11 standard.

5. The access point of claim 1, wherein the first MIMO mode, the second MIMO mode, and the third MIMO mode of the PHY processor comply with an IEEE 802.11n standard, and wherein the SISO mode of the PHY processor is associated with a wired data network.

6. The access point of claim 1, wherein the first set of one or more transmit data streams in the first group of one or more of the channel paths and the second set of one or more transmit data streams for the second group of one or more of the channel paths are processed such that the first set of one or more transmit data streams and the second set of one or more data streams are transmitted concurrently.

7. The access point of claim 1, wherein the first group of one or more of the channel paths is related to a first frequency band, wherein the second group of one or more of the channel paths is related to second frequency band, and wherein the first frequency band is different than the second frequency band.

8. The access point of claim 1, wherein the access point comprises a plurality of antennas, and wherein a first set of one or more antennas are configured to send the first set of one or more transmit data streams, and wherein a second set of one or more antennas are configured to send the second set of one or more transmit data streams.

9. A network comprising:
an access point comprising
a MAC processor configured to process and output a single transmit data stream; and
a physical layer (PHY) processor configured to split the single transmit data stream into a first set of one or more transmit data streams and a second set of one or more transmit data streams and further configured to concurrently process the first set of one or more transmit data streams according to a first MIMO mode of the PHY processor in a first group of one or more channel paths of the PHY processor and the second set of one or more transmit data streams according to a second MIMO mode of the PHY processor in a second group of one or more channel paths of the PHY processor;
the physical layer (PHY) processor configured to dynamically change channel allocation by reallocating the channel paths of the first group and the second group to a third group of one or more of the channel paths of the PHY processor and a fourth group of one or more of the channel paths of the PHY processor such that the PHY processor is configured to split the single transmit data stream into a third set of one or more transmit data streams and a fourth set of one or more transmit data streams and the PHY processor is configured to concurrently process the third set of one or more transmit data streams according to a third MIMO mode of the PHY processor in the third group of one or more of the channel paths of the PHY processor and the fourth set of one or more transmit data streams according to a SISO mode of the PHY processor in the fourth group of one or more of the channel paths of the PHY processor; and
a first plurality of wireless client devices configured to communicate with the access point.

10. The network of claim 9, wherein the first plurality of wireless client devices comprises a repeater configured to communicate with the access point and one or more second wireless client devices configured to communicate with the repeater.

11. The network of claim 10, wherein the repeater comprises a repeater PHY processor configured to process a third set of one or more data streams according to a MIMO mode of the repeater PHY processor in a first group of one or more channel paths of the repeater PHY processor, and a fourth set of one or more data streams according to a SISO mode of the repeater PHY processor in a second group of one or more channel paths of the repeater PHY processor.

12. The network of claim 11, wherein the MIMO mode of the repeater PHY processor is the same as the third MIMO mode of the PHY processor.

13. The network of claim 12, wherein the MIMO mode of the repeater PHY processor complies with an IEEE 802.11n standard.

14. The network of claim 11, wherein the repeater PHY processor is configured to concurrently process the first group of one or more of the channel paths of the repeater PHY processor and the second group of one or more of the channel paths of the repeater PHY processor.

15. A method comprising:
 transmitting a single transmit data stream from a MAC processor;
 splitting the single transmit data stream into a first set of one or more transmit data streams and a second set of one or more transmit data streams by a PHY processor;
 concurrently processing the first set of one or more transmit data streams according to a first MIMO mode of the PHY processor in a first group of one or more channel paths of the PHY processor and the second set of one or more transmit data streams according to a second MIMO mode of the PHY processor in a second group of one or more channel paths of the PHY processor;
 dynamically reconfiguring the PHY processor by reallocating the channel paths of the first group and the second group to a third group of one or more of the channel paths of the PHY processor and a fourth group of one or more of the channel paths of the PHY processor;
 splitting the single transmit data stream into a third set of one or more transmit data streams and a fourth set of one or more transmit data streams by the PHY processor;
 concurrently processing the third set of one or more transmit data streams according to a third MIMO mode of the PHY processor in the third group of one or more of the channel paths of the PHY processor; and
 processing the fourth set of one or more transmit data streams according to a SISO mode of the PHY processor in the fourth group of one or more channel paths of the PHY processor.

16. The method of claim 15, wherein the first set of one or more transmit data streams is related to a first frequency band, and wherein the second set of one or more transmit data streams is related to a second frequency band, the first frequency band is different than the second frequency band.

17. The method of claim 15, further comprising:
 coupling the first set of one or more transmit data streams to a repeater via a wireless connection; and
 coupling the second set of one or more transmit data streams to a first set of one or more wireless clients.

18. The method of claim 15, further comprising relaying, via the repeater, the first set of the one or more transmit data streams to a second set of one or more wireless clients.

19. A method comprising
 receiving a first set of one or more receive data streams according to a first MIMO mode of a physical layer (PHY) processor;
 receiving a second set of one or more receive data streams according to a SISO mode of the PHY processor;
 concurrently processing the first set of one or more receive data streams in a first group of one or more channel paths of the PHY processor and the second set of one or more receive data streams in a second group of one or more channel paths of the PHY processor;
 combining the first set of one or more receive data streams and the second set of one or more receive data streams into a single receive data stream before a MAC processor;
 processing the single receive data stream by the MAC processor; and
 dynamically reconfiguring the PHY processor by reallocating the channel paths of the first group and the second group to a third group of one or more of the channel paths of the PHY processor;
 receiving a third set of one or more receive data streams according to a second MIMO mode of the PHY processor;
 processing the third set of one or more receive data streams in the third group of one or more of the channel paths of the PHY processor.

20. The method of claim 19, wherein the first group of the one or more channel paths are processed by a first virtual PHY, and wherein the second group of the one or more channel paths are processed by a second virtual PHY.

* * * * *